United States Patent [19]
Gelman et al.

[11] Patent Number: 5,389,774
[45] Date of Patent: Feb. 14, 1995

[54] METHOD AND MEANS FOR CALIBRATING THE MAGNIFICATION OF ZOOM OPTICAL SYSTEMS USING RETICLE IMAGES

[75] Inventors: Boris Gelman, Fairport; D. Scott Davis, Rochester, both of N.Y.

[73] Assignee: Optical Gaging Products, Inc., Rochester, N.Y.

[21] Appl. No.: 148,396

[22] Filed: Nov. 8, 1993

[51] Int. Cl.$^6$ .............................................. G01J 1/20
[52] U.S. Cl. .................................. 250/201.1; 250/234
[58] Field of Search ............... 250/201.1, 201.2, 201.3, 250/201.8, 216, 237 R, 234; 359/424, 427, 428; 348/135, 137

[56] References Cited
U.S. PATENT DOCUMENTS
| | | | |
|---|---|---|---|
| 4,616,926 | 10/1986 | DiPietro et al. | 355/45 |
| 4,770,518 | 9/1988 | Emmel | 359/227 |
| 5,115,267 | 5/1992 | Kondo et al. | 354/221 |
| 5,276,546 | 1/1994 | Palm et al. | 250/234 X |

OTHER PUBLICATIONS
Choate, A. G., "Optical and Digital Processing Techniques In a Machine Vision Metrology System", in *Optical Engineering* 28(12) pp. 1311–1316, Dec. 1989.
Korn, G. A. et al., *Mathematical Handbook for Scientists and Engineers*, 1st ed., Sec. 2.4–6(a), McGraw-Hill, N.Y. 1961.

*Primary Examiner*—David C. Nelms
*Assistant Examiner*—John R. Lee
*Attorney, Agent, or Firm*—Shlesinger Fitzsimmons & Shlesinger

[57] ABSTRACT

After an operator has focused the zoom lens assembly of an optical measuring system on a workpiece, the zoom lens itself is adjusted to select a desired magnification. A reticle image in the form of a plurality of radially spaced, concentrically disposed circles is then projected, at the selected magnification, and via the zoom lens and a video camera, to a microprocessor (CPU), which electronically stores that particular image of the reticle for subsequent use, whenever it is desired to have the now-calibrated magnification reestablished. To reestablish the calibrated magnification at a later time, a new image of the reticle is projected to the CPU, and via the CPU onto a video screen. The previously recorded image of the reticle is also projected onto the video screen by the CPU, and is visually compared with the new reticle image. The zoom lens is then adjusted until the two images are coincident, at which time the previously selected magnification will have been reestablished.

13 Claims, 2 Drawing Sheets

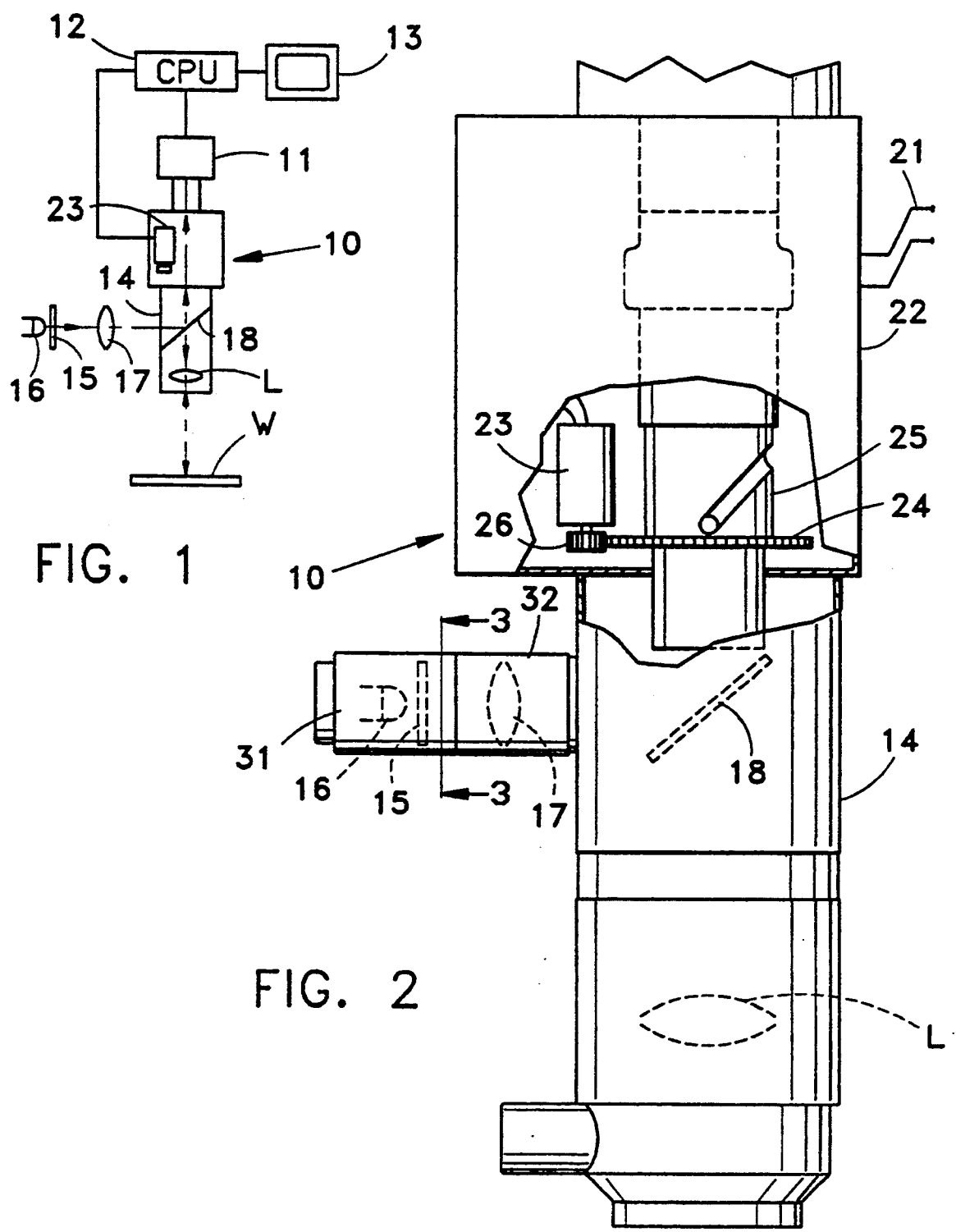

METHOD AND MEANS FOR CALIBRATING THE MAGNIFICATION OF ZOOM OPTICAL SYSTEMS USING RETICLE IMAGES

BACKGROUND OF THE INVENTION

This invention relates to optical measuring systems, and more particularly to zoom lens systems of the type which are employed in the field of optical dimensional metrology. More specifically, this invention relates to a novel method and means for calibrating a zoom lens system of the type described so that a selected or given magnification or field of view (FOV) of the lens system can be accurately re-established repeatedly without requiring re-calibration of the system from an external reference source.

One of the shortcomings of known optical systems of the type that employ a zoom lens for metrological applications is the difficulty in repeatedly and accurately resetting the lens in order to re-establish a particular magnification or field of view which may have been used previously during the course of conducting an optical measurement of a workpiece. This shortcoming results from the fact that the instrument's zoom lens typically is adjusted by a mechanical device, and consequently calibration of the magnification of the lens can be altered because of, for example, backlash in the mechanics of the zoom mechanism, wear of mechanical parts during useful life of the instrument, positioning error resulting from the electro-mechanical system which drives the zoom mechanism, and even thermal effects on the glass and metal parts of the system. It is, however, particularly desirable to be able accurately to re-establish one or more such magnifications in order to allow accurate measurement of a workpiece.

For example, the assignee of this application has heretofore marketed under the trademark SMART SCOPE an optical measuring system of the type in which a zoom lens is utilized to project the image of a workpiece to a video camera, which in turn projects the image via a microprocessor onto a monitor. To record measurements of the workpiece, the operator then shifts the workpiece holder laterally, and in a manner to cause the image of the workpiece likewise to be shifted laterally relative to a fixed scale on the monitor, thus to measure the image via such scale. For subsequent workpieces the operator again manipulates the zoom mechanism via a mouse or joystick which forms part of the SMART SCOPE equipment until an image of the new workpiece appears to be in proper focus on the monitor, after which the new workpiece can be manipulated, as described above, to effect the desired measurements.

One of the advantages of being able accurately to reestablish a previously employed magnification, rather than simply relying upon observation of the image of a workpiece on the monitor, is that it enables measurements of a workpiece to be made directly by the equipment without having to manipulate the workpiece to effect movement of its image relative to a scale on the monitor.

Accordingly, it is an object of this invention to obviate the above-noted shortcoming by providing apparatus for projecting and recording, for a selected magnification, an optical image of known dimension, so that when it is desired once again to adjust an associated zoom lens to the former (now stored) magnification, the optical image of known dimension can be used for accurately reestablishing the magnification.

Another object of this invention is to provide a novel method for obviating the above-noted shortcoming of a zoom lens system, by projecting a reference or reticle image into the zoom lens setting for a given or selected magnification, and electronically recording and storing the optical image for use at a later date to re-establish the former magnification setting.

Other objects of the invention will be apparent hereinafter from the specification and from the recital of the appended claims, particularly when read in conjunction with the accompanying drawings.

SUMMARY OF THE INVENTION

The zoom lens instrument or mechanism of a conventional measuring optical system, for example the type offered for sale by the assignee of this application under the registered trademark SMART SCOPE, is provided intermediate its ends with a beamsplitter, which is inclined at an angle of approximately 450 to, and extends transversely of, the axial center line of the instrument's zoom lens. A calibrating device is mounted at one side of the instrument to project an image of a reticle onto the upper face of the beamsplitter along an optical axis extending at right angle to the axis of the zoom lens. A video camera which forms part of the SMART SCOPE equipment supplies images via a microprocessor to a monitor, which permits the operator to observe the workpiece upon which the zoom lens is focused. The microprocessor also can be used to control the mechanical focusing of the zooms lens in a manner which forms no part of this invention.

To calibrate a give magnification of the zoom lens, the operator manipulates the SMART SCOPE equipment in known manner to focus the zoom lens on a workpiece, or the like. After the operator has focused on the optical system on the workpiece, the zoom lens itself is adjusted to select the desired magnification or field of view. Thereafter, illumination of workpiece is terminated, and a light source in the calibrating device is energized to provide a beam of light which illuminates the reticle and projects an image thereof onto the beamsplitter. The beamsplitter reflects the image thereof the reticle through the zoom lens to the video camera which, via the microprocessor, stores that particular image of the reticle for subsequent use whenever it is desired to have the now-calibrated magnification re-established. In the embodiment disclosed herein, the reticle constitutes a series of concentrically disposed, radially spaced rings, the largest of which should produce a video image of approximately 5 mm. at the low magnification of the zoom lens, and the smallest of which should produce a video image of approximately 5 mm. at the highest magnification of the lens.

When it is desired to reestablish a previously stored or selected magnification, the optical system is refocused in a known manner and the reticle device is again actuated to project an image of the reticle via the beamsplitter and zoom lens onto the video camera. That particular image is then compared with the reticle image which was previously stored in connection with that desired magnification, and the zoom lens itself is adjusted either manually or via software until both reticle images coincide. When software is employed, it compares the two images by measuring the diameter of the image then being projected by the calibrating device onto the video camera; and depending upon the sign of the measured deviation the software effects slight adjustment of the drive system of the zoom lens mechanism until such time that the two images are substantially identical.

THE DRAWINGS

FIG. 1 is a schematic representation of the method which is employed for calibrating a zoom lens in accordance with one embodiment of this invention;

FIG. 2 is a fragmentary elevational view of a zoom lens mechanism having mounted thereon a novel calibrating device made according to one embodiment of this invention, portions of the mechanism being cut away and shown in section;

DETAILED DESCRIPTION OF THE PREFERRED EMBODIMENTS

Figure 3:
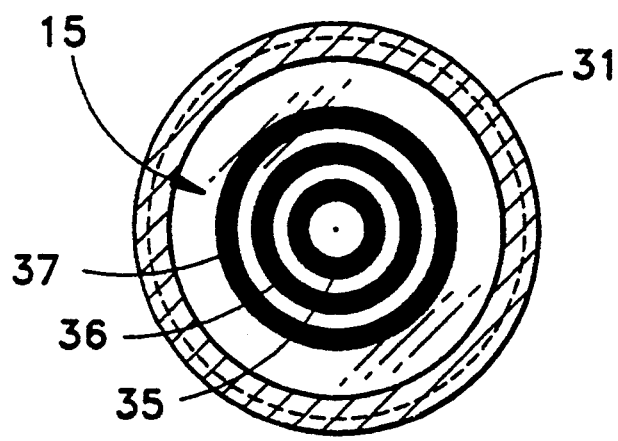
FIG. 3 is an enlarged sectional view taken generally along the line 3—3 in FIG. 2 looking in the direction of the arrows.

Referring now to the drawings by numerals of reference, and first to FIG. 1, 10 denotes generally a zoom lens assembly having at its upper end a video camera 11, which is coupled by a microprocessor or central processing unit 12 in known manner with a conventional monitor 13. A housing 14 which projects from the lower end of the zoom lens assembly 10 contains an objective lens L disposed to be focused on a workpiece W, or the like, so that when the workpiece is illuminated in known manner by a conventional light source (not illustrated) an image thereof can be projected via the objective lens L, the zoom lens assembly 10 and the video camera 11 and CPU 12 to the monitor 13. Mounted adjacent one side of the housing 14 and the zoom lens assembly 10 is a reticle 15, which will be described in greater detail hereinafter. A second light source 16, which is mounted adjacent the side of reticle 15 remote from the housing 14, is designed to project an image of the reticle through an objective lens 17 and an opening in the side of housing 14 and onto the surface of a beamsplitter 18, which is mounted in housing 14 beneath the zoom lens assembly 10 to extend transversely of its axis, and at an angle of approximately 45° both to the zoom lens axis and the axis of objective lens 17.

In this manner, when the workpiece W is not illuminated, and the light source 16 is energized, an image of the reticle will be projected by lens 17 and the beamsplitter 18 through the lens assembly 10 to the video camera 11 for electronic recording by the CPU 12. Fig. 1 illustrates in greater detail one configuration of a zoom lens assembly 10 which may be employed with this invention. More particularly, apart from the use of the beamsplitter 18, the reticle projecting mechanism 15, 16 and 17, and the hereinafter described means for comparing reticle images, the zoom lens assembly 10 may be generally similar to the conventional type employed in the above-noted equipment sold under the trademark SMART SCOPE. In this connection, to focus the system on a workpiece W vertical adjustment of the zoom lens assembly 10 with its attached camera 11 and objective lens housing 14 is effected in known manner by an arm 21, which is attached at one end to the housing 22 of the zoom lens assembly 10, and at its opposite end to a conventional mechanism (not illustrated) controlled by the CPU 12. After the optical system has been focused on the workpiece so as to display an image thereof on monitor 13, movement of arm 21 ceases and the zoom lens itself is adjusted to select the final or desired magnification (field of view). As shown in FIG. 2, this is effected by a servo motor 23, which is mounted in housing 22 adjacent a ring gear 24 that is secured to and surrounds the adjustable lens barrel 25 of the zoom lens. A spur gear 26, which is fixed to the shaft of motor 23, is in driving engagement with ring gear 24. By a mouse or joystick which forms part of the above-noted SMART SCOPE equipment, the operator then causes selective energization of the servo motor until the desired magnification or field of view has been reached. At such time the CPU 123 can then be utilized to effect the recording of selected measurements of the workpiece W via its projected image.

Referring to FIG. 3, the reticle 15 has inscribed or otherwise formed coaxially thereon or therein, a plurality of radially spaced, concentrically disposed rings 35, 36 and 37, each having respective inner and outer ring diameters of known dimensions. The smallest ring 35, which for example may have an internal diameter equal to approximately 0.5 mm., it will appear in proper size on monitor 13 when the zoom lens is at its largest magnification; and the outer diameter of the outermost ring 37, which for example may have a diameter of 3.0 mm., will be of proper size at the smallest magnification of the zoom lens. Inner and outer diameters of the other rings may be used to identify or calibrate intervening magnifications. The number of rings, and their respective inner and outer diameters may, of course, vary without departing from this invention. The advantage of using the rings for reticle images is that such images will not be sensitive to (i.e, will not be distorted) as the result of any accidental angular rotation of the camera or other parts of the mechanism.

As noted above, it often is necessary to return the zoom lens to a previous magnification in order once again to check a measurement. In order the make sure that this same magnification can be reestablished, and either immediately before or after the measurement of a workpiece W at a given magnification, that particular position of the zoom lens, i.e. that particular FOV, is recorded or calibrated for future use. To effect such calibration the illumination of the workpiece is eliminated or turned off, the light source 16 is illuminated, and the image of the reticle is projected by objective lens 17 onto the beamsplitter 18, which projects the image upwardly via the zoom lens to camera 11 for electronic recording by the CPU 12. In practice, it has been determined that the most efficient reticle 15 is disc-shaped in configuration, such as shown for example FIG. 3. The disc or reticle 15 is secured around its marginal, circumferential edges in a cylindrical housing 31 which is adjustably mounted at its forward end (the right end in FIG. 2) in the outer end of the barrel housing 32 which contains the objective lens 17.

Figure 4:
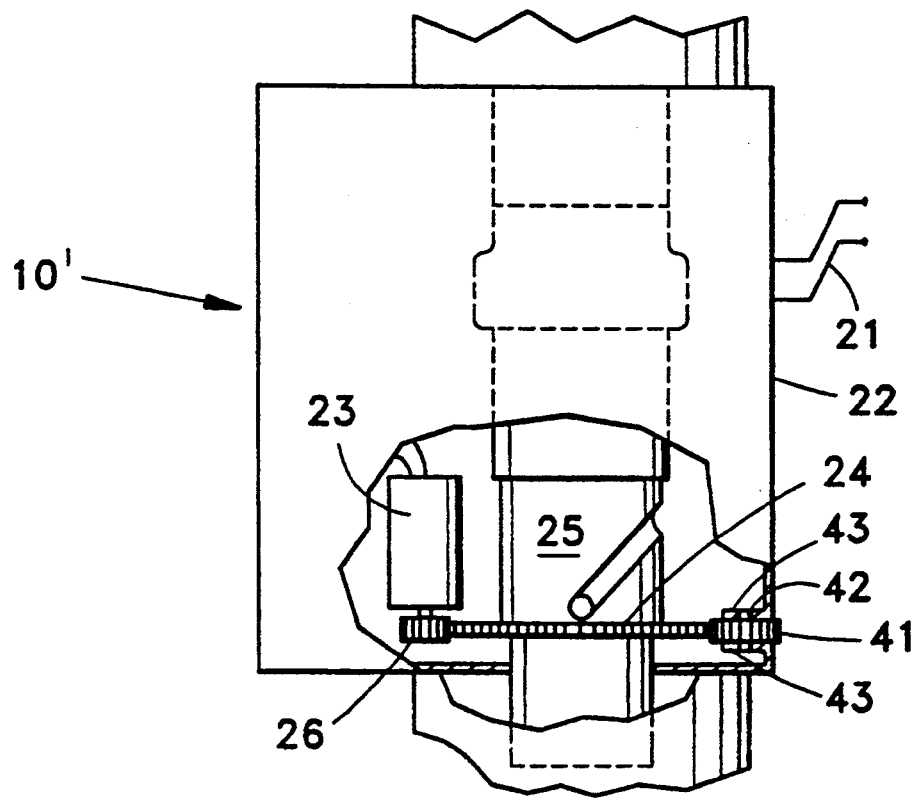
FIG. 4 is a fragmentary elevational view showing part of a modified form of this zoom lens mechanism.

The modified zoom lens mechanism 10' as shown in FIG. 4 permits an operator to adjust the zoom lens barrel 25 manually. In this embodiment a manually operable drive gear 41 is secured coaxially to a shaft 42 intermediate the ends thereof. Opposite ends of shaft 42 are rotably journaled in a pair of spaced projections or lugs 43 which project from the inner surface of housing 22 to support the teeth of gear 41 in driving engagement with ring gear 24. A portion of gear 41 projects through an opening in the wall of housing 22 so that gear 41 can be rotated manually, if desired, thereby to effect adjustment of lens barrel 25. This permits manual adjustment of the magnification (FOV) and manual comparison of a previously recorded reticle image with a new reticle image, thereby to reestablish a previously calibrated magnification.

In accordance with the a preferred embodiment of the invention, the zoom lens is precalibrated for a plurality of magnifications. For example, after the lens has been focused on a workpiece, the zoom lens is capable of being adjusted between first and second limit positions corresponding, for example, to highest magnification and lowest magnification, and effected by rotating the shaft of servo motor 23 selectively in opposite directions between two limit positions. In the existing SMART SCOPE equipment an optical encoder on the shaft of motor 23 operates in the CPU a counter which, by way of example, records approximately 15,000 counts as the shaft of motor 23 rotates from one to the other of its limit positions. Different magnifications can then be represented by different positions of the motor shaft, which positions in turn are represented by the number of signals recorded by the counter operated by the above-noted optical encoder.

To precalibrate such equipment for different magnifications, the zoom lens may be moved via motor 23 to its highest magnification, and then the encoder counter is zeroed, so that a zero count in the counter will represent the shaft position for the highest magnification, and a count of 15,000 will represent its position for the lowest magnification. Shaft positions for other magnifications may then be represented by counts between zero and 15,000. In the embodiment described hereinafter, the zoom lens is precalibrated for ten different positions, each motor shaft position being separated by 1666 counts.

The position of the shart of motor 23 is, however, only one of several parameters which are detected and recorded for the purpose of calibrating the zoom lens for a given magnification. In addition, the setting for the reticle illuminator 16 is recorded, and sub-pixel edge detection is utilized (see "Optical And Digital Processing Techiniques In A Machine Vision Metrology System", by A. G. Choate, Optical Engineering 28(12), 1311–1316 of December, 1989), to determine the precise positions (X, Y coordinates) of three points that lie on a selected circle of the image of reticle 15 that is projected onto the screeen of monitor 13. These three X, Y coordinates are then used (see "Mathematical Handbook for Scientists and Engineers" by G. A. and T. M. Korn, 1st Ed., Sec. 2.4–6(a), McGraw-Hill, N.Y. 1961) to determine the diameter of the selected circle. The edge detection routine also is used to determine the accurate field of view (FOV) in pixels/inch for a given or selected magnification. All five paramenters (motor shaft position, reticle light intensity, three X, Y coordinates, reticle circle diameter and the final FOV) are thus recorded to establish the calibration array for a specific magnification.

Referring further to the measurement of a circle of the reticle image on the monitor or screen 13, its diameter is determined first by selecting and recording in pixels the X, Y coordinates of any three angularly spaced points about the circle, X being the direction in which the holder for work W may be shifted laterally, and Y being the axis normal thereto. Those three X, Y coordinates can then be used as disclosed in the above-noted Handbook to determine the size of the circle. The lateral (X direction) movement of the workholder, and hence such movement of the work W, can also be detected and recorded in inches by the existing SMART SCOPE equipment. As noted hereinafter, this permits accurate determination and recording of a field of view (FOV) in pixels/inch.

Listed hereinafter are the various steps which are taken in order to precalibrate the equipment for a given magnification (FOV). In the specific example given, the steps are for precalibrating the equipment for a position corresponding to the zoom lens setting for its highest magnification. It will be understood that other magnifications can be precalibrated simply by moving the servo shaft to other positions, and then repeating the remaining calibration steps. For example, to precalibrate the lens for ten different magnifications, the shaft of servo motor 23 may be moved from its highest to its lowest magnification in increments corresponding to 1,666 counts on its encoder counter.

PRECALIBRATION

After the SMART SCOPE equipment has been started and the zoom lens assembly has been focused on an illuminated workpiece W, the various steps performed by the operator via the associated keyboard, mouse and software are as follows:

STEPS

No. 1: Move Zoom lens via motor 23 to highest magnification of work W and zero encoder counter.

No. 2: Turn off workpiece illumination and turn on reticle illumination.

No. 3: Adjust reticle light to saftisfactory level to produce a visible image.

No. 4: Using sub-pizel edge detection routine select three X,Y coordinates on largest reticle ring that completely fits in the FOV on screen of monitor 13.

No. 5: Using the three X,Y points measure the ring diameter in pixels.

No. 6: Save the measured ring diameter, the three X,Y coordinates, the setting (illumination level) of the reticle light, and the motor shaft position in the calibration array.

No. 7: Turn off reticle illumination and restore workpiece illumination to original setting.

No. 8: Place a clean vertical edge (e.g., razor blade edge) near center of FOV.

No. 9: Adjust workpiece illumination to satsifactory level.

No. 10: Measure current X position of the edge in pixels using sub-pixel edge detection routine.

No. 11: Move the image of the edge laterally by a small number of pixels in either direction by moving workholder in X direction.

No. 12: Run edge detection routine again to measure new edge position in pixels.

No. 13: Divide the number of pixels the edge was moved by the inches the workholder was moved in X direction to provide rough FOV measurement in pixels per inch.

No. 14: Using FOV value determined by step 13, move the edge in X direction to the ⅓ FOV position.

No. 15: Measure new position of edge in pixels using simple edge detection routine.

No. 16: Move edge in X direction to ⅔ FOV position.

No. 17: Measure new position of edge in pixels using simple edge detection.

No. 18: Determine the difference in pixels of the edge positions produced by steps 15 and 17, and the corresponding difference in inches in the positions of the workholder.

No. 19: Divide the difference in pixels determined by step 18 by the corresponding difference in inches to determine the final accurate FOV in pixels/inch.

No. 20: Save the final FOV value in the calibration array for highest magnification for the zoom lens.

To calibrate the zoom lens system 10 for a given magnification which is not necessarily one of the precalibrated positions, the zoom lens is adjusted via servo motor 23 to any new position the purpose of which is to establish a new FOV (magnification) that is best suited for the workpiece being measured. The above steps are executed and the final FOV value in the calibration array for this motor position is saved.

RETURNING TO A PRECALIBRATED POSITION

Whenever a user wishes to return the zoom lens to a previously calibrated magnification, the image of reticle 15 is once again projected onto beamsplitter 18 and this new image is projected via camera 11 to the CPU 12 for comparison with the previously recorded reticle image. The various steps in this process are as follows:

STEPS

No. 1 Move zoom lens via motor 23 to any new position, the purpose of which is to select a new FOV that is best suited for the workpiece being measured.

No. 2 Determine the precalibrated position with corresponding motor 23 position nearest to the new position selected.

No. 3 Move the motor 23 to the nearest precalibrated position.

No. 4 Turn off workpiece illumination and turn on reticle illumination.

No. 5 Set reticle illumination to the level saved during precalibration for this position.

No. 6 Using the three X, Y points saved during precalibration for this position, measure the ring diameter in pixels using subpixel edge detection routine.

No. 7 Compare the measured size of the ring diameter with the reference value saved for the ring diameter during precalibration.

No. 8 If the measured ring diameter is larger than the reference value (by more than some arbtrary tolerance) move the motor 23 by a small amount towards the lowest magnification position. If the measured ring diameter is smaller than the reference value (by more than some arbitrary tolerance) move the motor 23 by a small amount towards the highest magnification position.

No. 9 Repeat steps 6, 7 and 8 until the measured ring diameter is equal to the reference diameter to within some arbitrary tolerance.

No. 10 Turn off the reticle illumination and restore the workpiece illumination to its original setting.

No. 11 Recall the value for pixels per inch saved during precalibration for this position. Use this value for any measurements taken at this magnification.

From the foregoing it will be apparent that the present invention provides a novel method and apparatus for accurately recording or calibrating one or more magnifications into which a zoom lens system of the type described can be adjusted for the purpose of inspecting and measuring workpieces and the like. Whenever a given magnification is selected, the corresponding reticle image is observed and recorded for future use. Thereafter, when it is desired to reestablish the magnification corresponding to the previously recorded reticle image, the light source 16 is reenergized to project a new image of the reticle 15 via the zoom lens assembly 10 and the camera 11 to the CPU 12. This new image is then compared with the previously recorded image of the reticle either manually by gear 41, or by the associated software which adjusts the zoom lens system 10 via motor 23 until such time that this newly projected image of the reticle 15 corresponds substantially exactly to the previously recorded image thereof. At such time the zoom lens of system 10 will have been adjusted to reestablish the exact, desired magnification.

While this invention has been illustrated and described in detail in connection with certain embodiments thereof, it will be apparent that it is capable of still further modification, and that this application is intended to cover any such modification which may fall within the scope of one skilled in the art or the appended claims.

We claim:

1. In an optical measuring system of the type in which the image of a workpiece which is to be measured is projected by an adjustable zoom lens assembly onto a video camera which via a central processing unit (CPU) is capable of recording and displaying an image of the workpiece on a video screen, the improvement comprising a reticle mounted adjacent said zoom lens assembly, means operable upon adjustment of the zoom lens in said assembly to a given magnification to project an image of said reticle at said magnification, and via said zoom lens and video camera, to said CPU for electronic recording of said reticle image by said CPU.

means operable, when it is desired to reestablish said given magnification, to project a new image of said reticle via said zoom lens and camera to said CPU for comparison on said screen with the previously recorded image of said reticle, and means operable during the comparison of said new image with said previously recorded image to adjust said zoom lens until said new image corresponds with said recorded image, whereby said given magnification is reestablished.

2. An optical measuring system as defined in claim 1, wherein said reticle comprises a plurality of radially spaced, concentrically disposed rings.

3. An optical measuring system as defined in claim 1, wherein said zoom lens assembly comprises a housing having said zoom lens adjustably mounted in one end thereof, and having an objective lens mounted in the opposite end thereof coaxially of said zoom lens, a beam splitter is mounted in said housing between said zoom lens and said objective lens to register with said reticle through an opening in said housing, and a light source is mounted at the side of said reticle remote from said opening in said housing and is operable selectively to project an image of said reticle toward said beam splitter.

4. An optical measuring system as defined in claim 3, wherein said means to adjust said zoom lens includes means on said housing for effecting manual adjustment of said zoom lens in said assembly thereby to effect adjustment of said magnification (FOV).

5. An optical measuring system as defined in claim 3, wherein said means to adjust said zoom lens comprises a servo motor on said housing drivingly connected to said zoom lens and operable to shift said lens in opposite directions selectively to increase and decrease, respectively, said magnification.

6. An optical measuring system as defined in claim 5, including means connecting said servo motor to said CPU for control thereby upon reestablishment of said given magnification.

7. A method of recording and reestablishing a selected magnification of an adjustable zoom lens in a zoom lens assembly of the type which is disposed to be focused upon a workpiece to project an image thereof via said assembly and a video camera to a central processing unit (CPU) capable of retrievably recording and projecting said image on a video screen, including focusing said lens assembly on a workpiece, and adjusting said zoom lens in said assembly to a selected magnification, projecting the image of a reticle at said selected magnification through said zoom lens and said camera to said CPU for electronic recording therein, thereby to provide a record of the reticle image as it appears at said selected magnification, subsequently projecting a new image of said reticle via said zoom lens and camera to said CPU whenever it is desired to reestablish said selected magnification, comparing said new image of the reticle with the previously recorded image of said reticle, and adjusting said zoom lens until the new image of said reticle is substantially equal to the previously recorded image of said reticle.

8. A method as defined in claim 7, wherein comparing said new image of the reticle with the previously recorded image thereof includes simultaneously projecting both of said images onto said video screen to permit visual comparison thereof.

9. The method as defined in claim 8, including adjusting said zoom lens toward its lowest magnification, if the observed new image is larger than the recorded image, and toward the highest magnification, if the observed new image is smaller than the recorded image.

10. A method as defined in claim 7, including calibrating said zoom lens for a plurality of predetermined magnifications of a workpiece upon which the zoom lens assembly is focused, including successively adjusting said zoom lens in said assembly to a different one of a plurality of magnifications of the workpiece upon which the assembly is focused, and each time said zoom lens is adjusted to one of said magnifications, projecting the image of said reticle through said zoom lens and said camera to said CPU for recording, thereby to provide records of said reticle images for each of said plurality of magnifications.

11. A method of calibrating magnifications of the adjustable zoom lens of the zoom lens assembly in an optical measuring system of the type in which the image of a workpiece that is to be measured is projected by the zoom lens assembly onto a video camera which via a central processing unit (CPU) is capable of retrievably recording and displaying an image of the workpiece on a video screen, comprising focusing the zoom lens assembly on a workpiece, adjusting the zoom lens of said assembly to each of a plurality of desired magnifications of said workpiece, providing a reticle of predetermined configuration, and each time said zoom lens is adjusted to a different one of said desired magnifications, projecting the image of said reticle at said one magnification through said zoom lens and said camera to said CPU for electronic recording therein, thereby providing retrievable images of said reticle at each of said desired magnifications.

12. A method as defined in claim 11, including projecting an image of said reticle onto said video screen each time said zoom lens is adjusted to one of said desired magnifications, measuring the projected image of said reticle as it appears on said screen to determine selective dimensions thereof, and recording said dimensions in the CPU for use in subsequently retrieving said projected image.

13. A method as defined in claim 12, wherein said projected reticle image comprises a plurality of radially spaced, concentrically disposed rings, and said measuring of said projected image on said screen includes determining the diameter of the largest of said rings which completely fits in the field of view of the image on said screen.

* * * * *